No. 634,462. Patented Oct. 10, 1899.
J. W. HYATT.
BUOYANT METALLIC AGENT FOR PURIFYING WATER.
(Application filed Dec. 15, 1898.)
(No Model.)
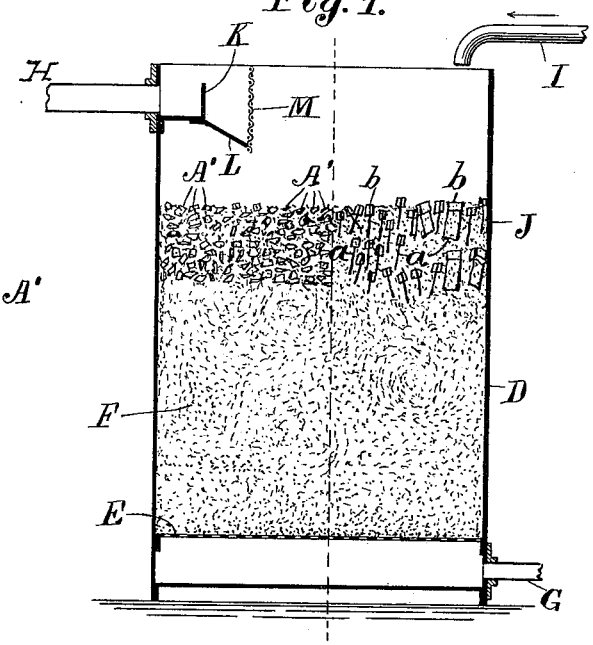
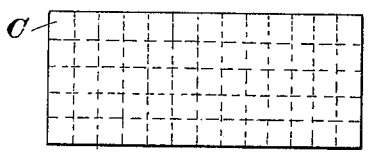
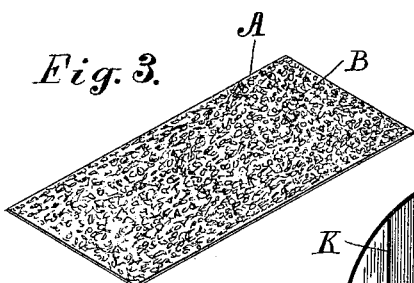
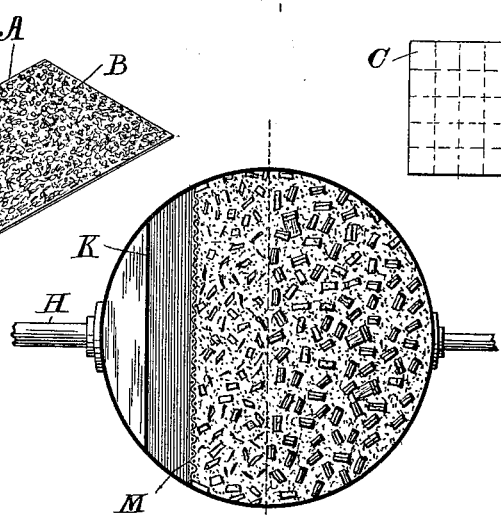
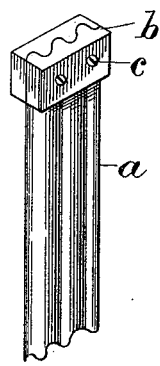
Attest:
L. Lee
Edw. F. Kinsey
Inventor.
John W. Hyatt, per
Thomas S. Crane, Atty.
THE NORRIS PETERS CO., PHOTO-LITHO., WASHINGTON, D. C.

UNITED STATES PATENT OFFICE.

JOHN W. HYATT, OF NEWARK, NEW JERSEY.

BUOYANT METALLIC AGENT FOR PURIFYING WATER.

SPECIFICATION forming part of Letters Patent No. 634,462, dated October 10, 1899.

Application filed December 15, 1898. Serial No. 699,321. (No model.)

*To all whom it may concern:*

Be it known that I, JOHN W. HYATT, a citizen of the United States, residing at Newark, county of Essex, State of New Jersey, have invented certain new and useful Improvements in Buoyant Metallic Agents for Purifying Water and Filters for Using the Same, fully described and represented in the following specification and the accompanying drawings, forming a part of the same.

The object of this invention is to facilitate the use of metallic particles for coöperation with a granular filter-bed in a process for precipitating and removing the impurities from water. In such processes it has been common heretofore to use zinc or iron in certain forms which, by reason of their specific gravity, could not be readily diffused through the substance of a filter-bed and which if used in a granular filter-bed would accumulate at the bottom and interfere with its normal operation.

My invention consists, primarily, in the union, with the metal that is used in the filter-bed, of substances of much less specific gravity, so that the metallic particles by reason of such union may be disposed within or upon the top of the filtering material. When the water is supplied to the top of the bed for filtration, it thus comes first in contact with the metallic particles and is impregnated with the chemical elements which operate upon the water in the desired manner before its passage downwardly through the filtering material, and the filtering operation is thus much more effective in removing the impurities. The metal may be used in the form of small particles, chips, flakes, or thin sheets and is united to muslin or other vegetable fibers, cork, wood, or any other buoyant substance adapted to alter its specific gravity in the desired degree. By such means the combined particles may be made lighter than the sand or other material forming the filter-bed and are thus adapted, when the bed is broken up and agitated during the washing operation, to be carried to the top by the currents of washing-water and remain there during the normal operation of the filter. The metallic particles may be secured to the muslin or other like material by means of shellac varnish, which is so little affected by water that it produces no effects which are detrimental. Comminuted metal or chips may be sprinkled upon a large piece of muslin moistened with adhesive shellac varnish, and the combined product may, when the varnish is entirely dry, be cut up into flakes about half an inch square, which I find by experience are of suitable dimensions to use in a sand filter-bed. Very thin sheets of the metal (as from two to three thousandths of an inch in thickness) may be cemented in like manner to muslin and cut up into small flakes, and such metal may be cemented to one or both sides of the fabric, as may be desired, the proportion of metal to the fabric being readily discovered by experience, to make the product lighter than the substance of the filter-bed and heavier than the water, so that it may not be floated away during the washing of the filter. Large pieces of sheet metal may be adapted to remain upon or in the surface of the filter-bed by attaching a mass of cork, wood, or other suitable material to one end of such sheets and proportioned to give the product the desired gravity.

The invention, secondly, includes a particular construction of screen to prevent such metallic particles or the sand of the filter-bed from being washed away by the water-current used during the washing operation.

The invention will be understood by reference to the annexed drawings, in which—

Figure 1 is a vertical section of a filter, illustrating my improvements. Fig. 2 is a plan of the same. Fig. 3 is a perspective view of a sheet of light fabric, as muslin, having metallic particles cemented to its surface. Fig. 4 is a diagram of such sheet, with dotted lines indicating the divisions necessary to convert it into small flakes. Fig. 5 is a perspective view of one of such flakes, with the small particles of metal adherent to its surface. Fig. 6 is a perspective view of a flake having a muslin or wooden body, with sheet metal cemented upon both of its sides, the thickness of the layers in Figs. 3, 5, and 6 being unavoidably exaggerated to represent them upon the drawings. Fig. 7 is a perspective view of a corrugated sheet of thin metal, with a buoyant head secured at one end.

A designates the sheet of muslin or analogous fabric, upon the surface of which the metallic particles B are cemented.

C C are the dotted lines representing the divisions of the fabric to form the flakes such as are represented in A', Fig. 5. Such flakes may be made square and varying in length and breadth from a quarter of an inch to an inch, the buoyancy imparted to the metal by the union of a lighter material enabling the currents used in washing the filter-bed to force the flakes upwardly and to keep them at the top of the bed. In Fig. 6 the flake is shown of oblong form with three layers in its thickness, the outer layers representing metallic sheets $a$, while the middle layer represents the muslin or other light substance A. Fig. 7 represents an oblong strip of sheet metal $a$, corrugated longitudinally to stiffen it and having wooden or cork head $b$ clamped thereon by screws or rivets $c$.

In Figs. 1 and 2, D represents a vertical filter with open top and screen E within the bottom adapted to support the granular material F of the filter-bed. G designates the pipe for delivering the filtered water or supplying a reverse current of water under pressure for washing the bed. H designates an overflow-pipe at the top of the filter for carrying off the washing-water and impurities, and I represents a pipe supplying the impure water to the top of the filter-casing for filtration. J represents the top layer of the filter-bed, and two forms of the buoyant particles are represented, respectively, at the right and left hand sides of the center line, numerous flakes A' being shown at the left side and metallic strips $a$ being shown at the right-hand side of the bed, supported each by a buoyant head B. A deflector K is shown formed within the filter-casing adjacent to the outlet-pipe H, with its inner edge at a suitable height below the top of the casing to permit the wash-water to flow over. An arresting-plate L is extended downwardly from the bottom of the deflector to prevent the upward current of washing-water from lifting the sand directly to the edge of the deflector. This arrester forces the current laterally away from the deflector and compels the current to move horizontally or laterally toward the deflector, which permits the sand to drop upon the arrester before it reaches the deflector, and thus prevents it from escaping to the outlet-pipe. A screen M, of wire-netting, is shown extended across within the casing at the inner edge of the arrester L to positively prevent the accidental washing away of any of the flakes or semibuoyant particles from the filter-casing.

The bed F is represented of coarse sand, and some of the sand particles are represented as lying upon the upper side of the arrester L, where they would be deposited from the escaping current as the current moves from the screen M to the deflector. The arrester is inclined downwardly from the foot of the deflector to discharge such sand back into the filter-bed; but the normal functions of the arrester in preventing the washing-current from carrying the sand upwardly adjacent to the deflector would be performed with equal efficiency if the arrester were made horizontal.

I have shown herein the means for cementing the flakes, sheets, or metallic particles upon a sheet of fabric-like muslin, and also for increasing the buoyancy of metallic plates by attaching a float thereto, as shown in Fig. 7; but it is obvious that other means may be devised, and I do not therefore limit myself to the constructions shown in my drawings. The metallic particles may be cemented or otherwise secured to loose vegetable fibers and the same cut into fragments of a size to move about freely in the substance of the filter-bed, as it would be very undesirable to clog the surface of the bed where the water penetrates during the filtering operation. Thin metallic sheets may be secured by rivets to a sheet of muslin or analogous fabric or small tongues or prongs may be stamped through the metallic sheet to be inserted through the muslin and clenched thereon, and any other suitable means may be used for securing the metal to a body of less specific gravity.

Where metals, as zinc, iron, or aluminium, have been heretofore used in water-filtering processes, the water has commonly been mingled with the metal in a separate vessel, and mechanical means has been required to stir the metal particles to prevent them from oxidizing into a solid mass, and the water from such vessel is afterward forced through the filter to remove the precipitated impurities. My invention avoids the use of a separate vessel, as it adapts the metallic particles to be placed directly in the filter, because they arrange themselves automatically in or upon the top of the filter-bed, where they may operate upon the water before it is filtered. In this position the metallic particles are cleansed when the filter-bed is agitated in the washing operation, as they are dispersed among the particles of sand and are abraded by the same in a sufficient degree to keep the metallic particles clean, so as to operate upon the water efficiently. My invention not only avoids the use of a separate vessel and enables a single appliance to perform all the functions required to purify the water, but it avoids the labor and the mechanism required to stir the metallic particles where they are placed in a separate vessel, in which they would be compacted in a solid mass until they were mechanically agitated. By suspending the particles among the particles of abrading material in the filter-bed the whole is disintegrated and agitated whenever the filter-bed is washed, and the metallic particles are prevented from uniting together and any impurities deposited upon their surface are thoroughly cleansed when the filter-bed is washed.

In the present application the metallic particles are not capable of floating upon water; but I have termed them "buoyant" because their specific gravity is so adjusted that they may be readily moved by a current of water and are thus, owing to their magnitude and the surface which they expose to the water-currents, readily carried to the top of the bed when the upward current of water is directed through the bed in the washing operation. The metallic particles are therefore so constituted that at each disintegration of the filter-bed during the washing operation they are freely moved among the particles of granular material and are deposited by the water-currents in the upper part of the bed. In the drawings such particles are shown disposed in the upper fifth of the bed and such a proportion of the metallic particles is effective in furnishing to the water the elements needed to precipitate and agglutinate the impurities before the water passes through the bed to separate them.

Having thus set forth the nature of the invention, what is claimed herein is—

1. As a new article of manufacture, an agent for use in purifying water, consisting of metallic particles united with a suitable buoyant substance.

2. As a new article of manufacture, an agent for use in purifying water, consisting of metallic particles united with a buoyant substance of greater specific gravity than water, and less specific gravity than sand, as and for the purpose set forth.

3. As a new article of manufacture, an agent for use in purifying water, consisting of a thin flat flake composed of metal united to a suitable buoyant substance.

4. The means for diffusing metallic particles through or upon a granular filter-bed, which consists in uniting a suitable buoyant substance with the metallic particles, as and for the purpose set forth.

5. In an apparatus for purifying water, the combination, with a suitable casing, of a filter-bed of granular material, and a suitable proportion of metallic particles united with buoyant material to diffuse such particles through or upon the substance of the bed.

6. In a filter, the combination, with a filter-bed of granular material, of metallic particles united with such a proportion of buoyant material as to be heavier than water and lighter than the granular particles.

7. In a filter, the combination, with a bed of granular material, of metallic particles united to buoyant substance, and of such specific gravity that a reverse current in agitating the filter-bed operates to diffuse the said metallic particles through or upon the substance of the bed.

8. In a filter, the combination, with a casing having a granular filter-bed with space above the same for the expansion of the filter-bed when washing, and a waste-outlet pipe near the top of the casing, of an imperforate deflector extended upwardly adjacent to the mouth of such outlet-pipe, and the arrester L projected from the base of the deflector inwardly over the surface of the filter-bed, whereby an upward current adjacent to the deflector is prevented, and particles carried upwardly by the washing-water are compelled to move horizontally below the edge of the deflector, before reaching the latter, as and for the purpose set forth.

9. In a filter, the combination, with a casing having a granular filter-bed with space above the same for the expansion of the filter-bed when washing, and a waste-outlet pipe near the top of the casing, of the deflector K projected inwardly over the filter-bed from the lower side of the outlet, and then upwardly above the top of the outlet, the arrester *l* attached to the base of the deflector and projected inwardly over the filter-bed, and a screen extended from the edge of the arrester, to prevent the escape of the buoyant particles, substantially as herein set forth.

In testimony whereof I have hereunto set my hand in the presence of two subscribing witnesses.

JOHN W. HYATT.

Witnesses:
THOMAS S. CRANE,
FRANK L. MORTON.